US012652464B2

(12) United States Patent　(10) Patent No.: US 12,652,464 B2

Miyoshi　(45) Date of Patent: Jun. 9, 2026

(54) IMAGING DEVICE

(71) Applicant: CANON KABUSHIKI KAISHA, Tokyo (JP)

(72) Inventor: Nari Miyoshi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 71 days.

(21) Appl. No.: 18/609,973

(22) Filed: Mar. 19, 2024

(65) Prior Publication Data

US 2024/0323519 A1　Sep. 26, 2024

(30) Foreign Application Priority Data

Mar. 23, 2023　(JP) ................................. 2023-046696

(51) Int. Cl.
H04N 23/667　(2023.01)
H04N 23/63　(2023.01)

(52) U.S. Cl.
CPC ......... H04N 23/667 (2023.01); H04N 23/635 (2023.01)

(58) Field of Classification Search
CPC .. H04N 23/667; H04N 23/635; H04N 23/632; H04N 23/633; H04N 23/683; H04N 23/631; H04N 23/695; H04N 5/77; H04N 23/611; H04N 23/62
See application file for complete search history.

(56) References Cited

U.S. PATENT DOCUMENTS 9,232,134 B2　1/2016　Yuge
2022/0360712 A1　11/2022　Kim

FOREIGN PATENT DOCUMENTS

| EP | 4340381 A1 | | 3/2024 | |
| JP | 2001103438 A | * | 4/2001 | ............ H04N 7/142 |
| JP | 2013117650 A | * | 6/2013 | |
| JP | 5686869 B2 | | 3/2015 | |
| JP | 2021029035 A | | 2/2021 | |

* cited by examiner

*Primary Examiner* — Yogesh K Aggarwal

(74) *Attorney, Agent, or Firm* — Canon U.S.A., Inc. IP Division

(57) ABSTRACT

An imaging device includes an image sensor and a controller configured to perform control to display or record a range of at least a part of an image captured by the image sensor, wherein in a first state in which self-photographing is not performed, the controller performs control to display or record a first range of the image, and in a second state in which the self-photographing is performed, the controller performs control to display or record a second range wider than the first range of the image.

11 Claims, 12 Drawing Sheets

YAW

ROLL

PITCH

100

VERTICAL

LIGHT AXIS

HORIZONTAL

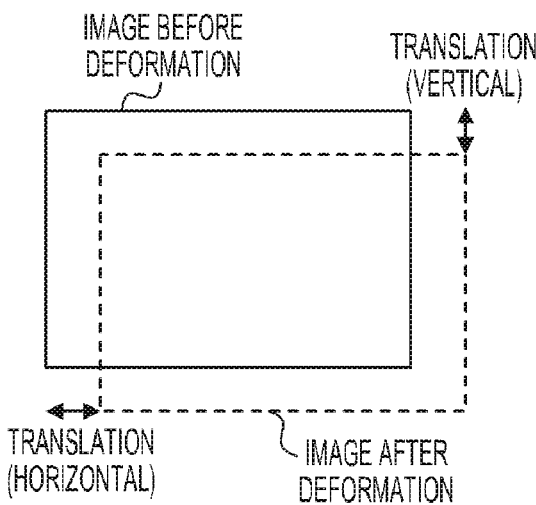

IMAGE BEFORE DEFORMATION

TRANSLATION (VERTICAL)

TRANSLATION (HORIZONTAL)

IMAGE AFTER DEFORMATION

*FIG. 3D*

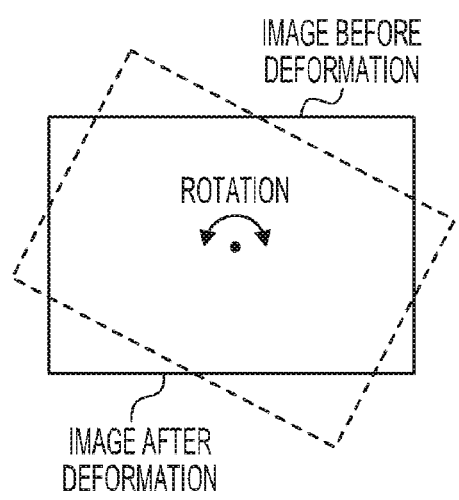

IMAGE BEFORE DEFORMATION

ROTATION

IMAGE AFTER DEFORMATION

*FIG. 3E*

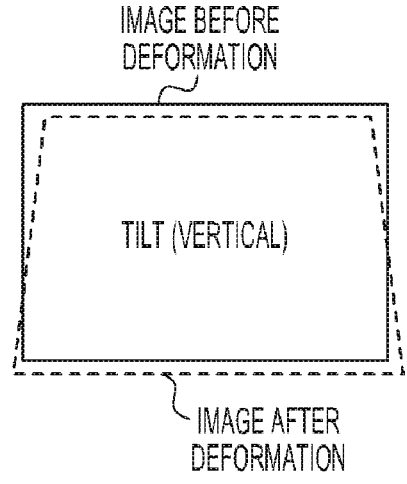

IMAGE BEFORE DEFORMATION

TILT (VERTICAL)

IMAGE AFTER DEFORMATION

*FIG. 3F*

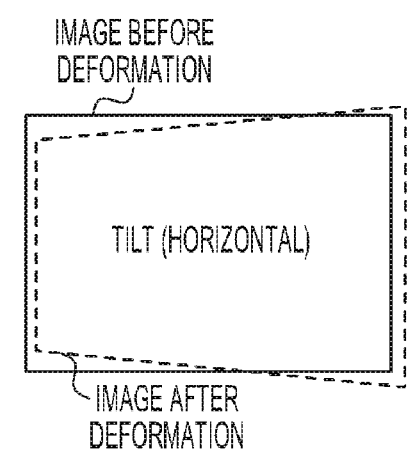

IMAGE BEFORE DEFORMATION

TILT (HORIZONTAL)

IMAGE AFTER DEFORMATION

*FIG. 3G*

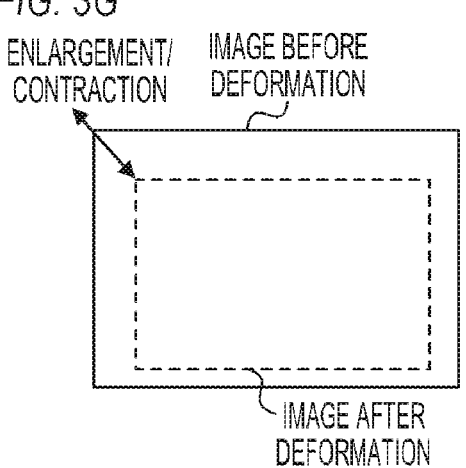

ENLARGEMENT/ CONTRACTION

IMAGE BEFORE DEFORMATION

IMAGE AFTER DEFORMATION

*FIG. 3H*

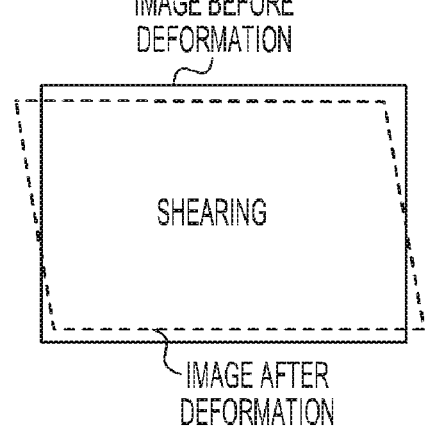

IMAGE BEFORE DEFORMATION

SHEARING

IMAGE AFTER DEFORMATION

301

302    O    303

FIG. 4A
FIG. 4B
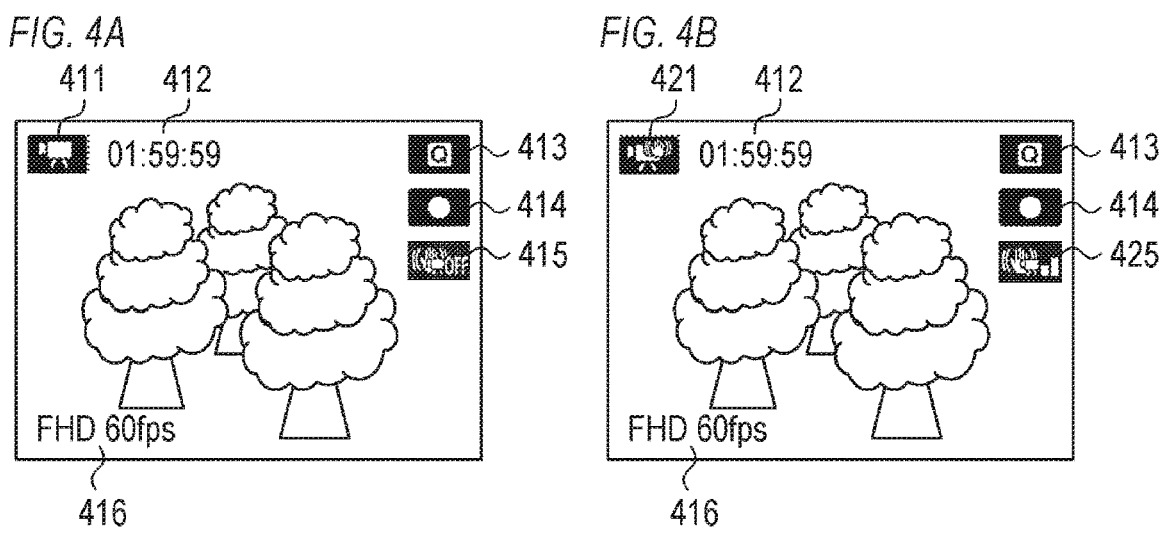
FIG. 4C
FIG. 4D
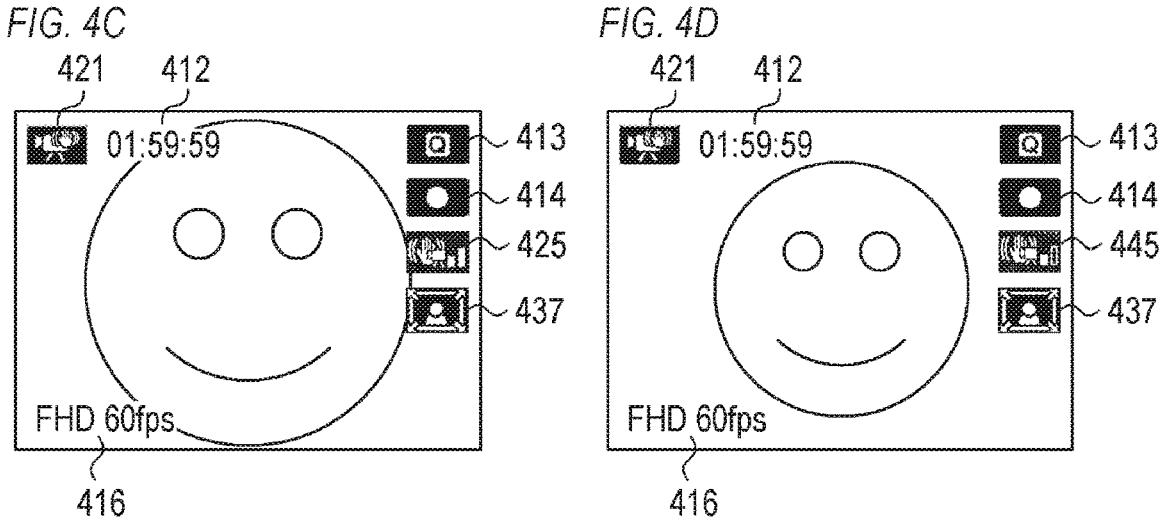
FIG. 4E
FIG. 4F
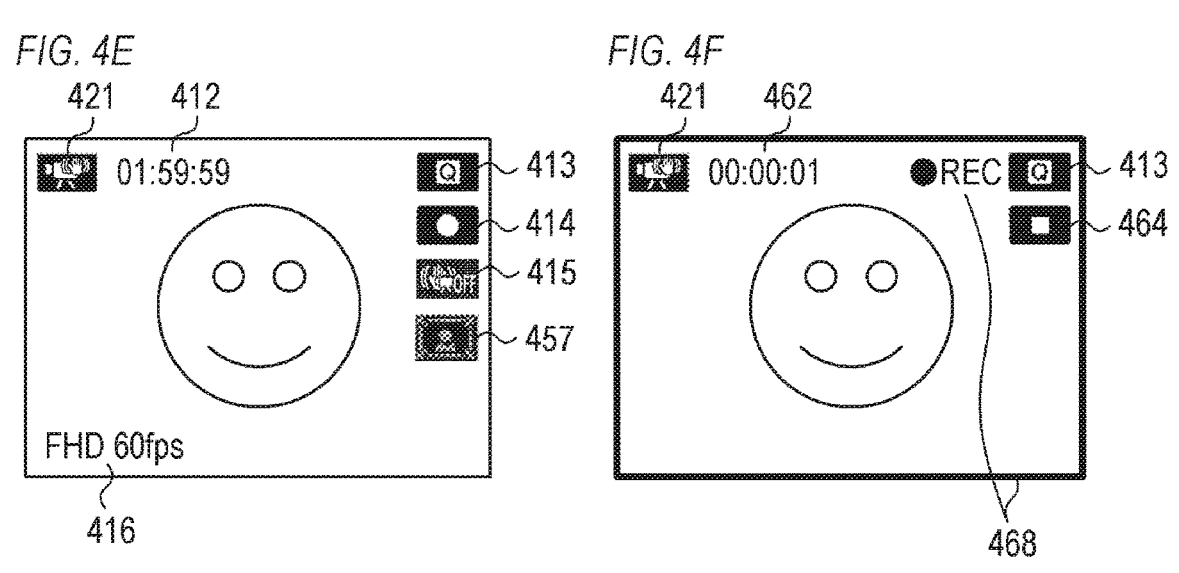

FIG. 7

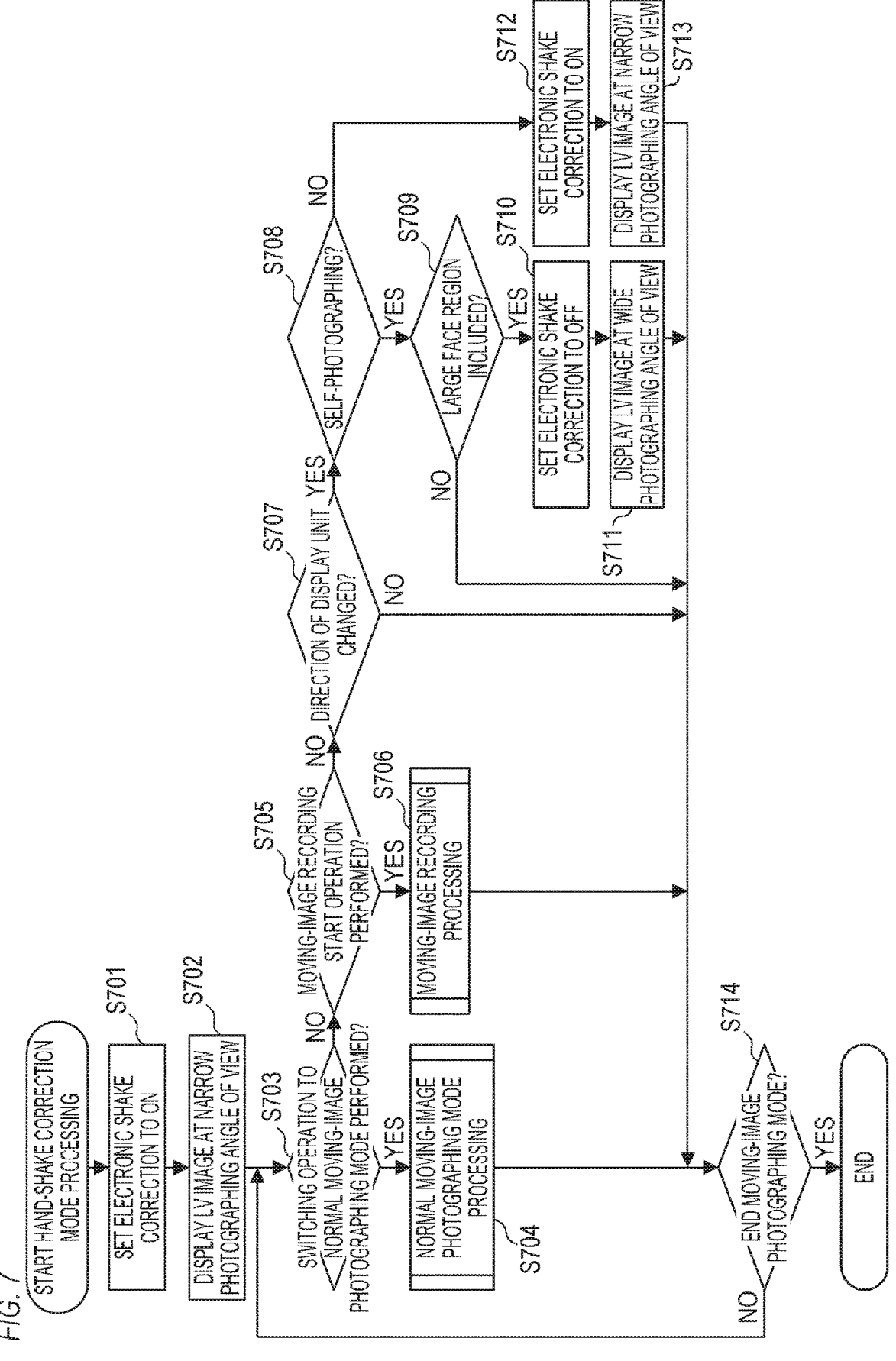

START HAND-SHAKE CORRECTION MODE PROCESSING

S701 SET ELECTRONIC SHAKE CORRECTION TO ON

S702 DISPLAY LV IMAGE AT NARROW PHOTOGRAPHING ANGLE OF VIEW

S703 SWITCHING OPERATION TO NORMAL MOVING-IMAGE PHOTOGRAPHING MODE PERFORMED?

YES → S704 NORMAL MOVING-IMAGE PHOTOGRAPHING MODE PROCESSING

NO

S705 MOVING-IMAGE RECORDING START OPERATION PERFORMED?

YES → S706 MOVING-IMAGE RECORDING PROCESSING

NO

S707 DIRECTION OF DISPLAY UNIT CHANGED?

YES

NO

S708 SELF-PHOTOGRAPHING?

YES

NO

S709 LARGE FACE REGION INCLUDED?

YES → S710 SET ELECTRONIC SHAKE CORRECTION TO OFF

NO

S712 SET ELECTRONIC SHAKE CORRECTION TO ON

S711 DISPLAY LV IMAGE AT WIDE PHOTOGRAPHING ANGLE OF VIEW

S713 DISPLAY LV IMAGE AT NARROW PHOTOGRAPHING ANGLE OF VIEW

S714 END MOVING-IMAGE PHOTOGRAPHING MODE?

NO

YES → END

IMAGING DEVICE

BACKGROUND

Technical Field

The present disclosure relates to an imaging device and, in particular, to a technology to control a photographing angle of view such as a range of a recording target in a captured image.

Description of the Related Art

A technology to narrow a photographing angle of view (a range of a recording target in a captured image) so that hand-shake correction is enabled during photographing of a moving image (recording of a moving image) in a moving-image photographing mode has been proposed. As another technology, it is disclosed in Japanese Patent Application Laid-open No. 2021-029035 that the focal distance of a zoom lens is, in a case where vibrations beyond an allowable range are detected, controlled to a (wide-angle) focal distance shorter than a focal distance in a case where the vibrations beyond the allowable range are not detected.

However, in the conventional technologies, there is a case that only the face of a user is included in a photographing angle of view when the photographing angle of view (a range of a recording target in a captured image) is narrowed. In this case, a user (photographer) is needed to perform a setting change such as turning off hand-shake correction in order to perform self-photographing at a photographing angle of view including the user himself/herself and a background. Moreover, there is a case that a normal photographing mode is switched to a self-photographing mode during photographing of a moving-image but a setting change is often disabled during the photographing of the moving image. Even where a setting change is enabled during photographing of a moving image, there is a case that the moving image is fluctuated or a hand is reflected in the moving image due to the setting change. Since hand shake caused during self-photographing depends on a user, it is difficult to solve these problems with the technology disclosed in Japanese Patent Application Laid-open No. 2021-029035.

SUMMARY

The present disclosure provides a technique making it possible to display or record a self-photographing image at an appropriate photographing angle of view (in a range in a captured image) according to whether a self-photographing state is created.

An imaging device according to an aspect of the present disclosure includes an image sensor and a controller configured to perform control to display or record a range of at least a part of an image captured by the image sensor, wherein in a first state in which self-photographing is not performed, the controller performs control to display or record a first range of the image, and in a second state in which the self-photographing is performed, the controller performs control to display or record a second range wider than the first range of the image.

Further features of the present disclosure will become apparent from the following description of exemplary embodiments with reference to the attached drawings.

BRIEF DESCRIPTION OF THE DRAWINGS

FIGS. 3C to 3H are diagrams each showing deformations of a captured image.
FIGS. 4A to 4F are diagrams each showing a displayed screen.
FIG. 7 is a flowchart of hand-shake correction mode processing.

DESCRIPTION OF THE EMBODIMENTS

Figure 1A:
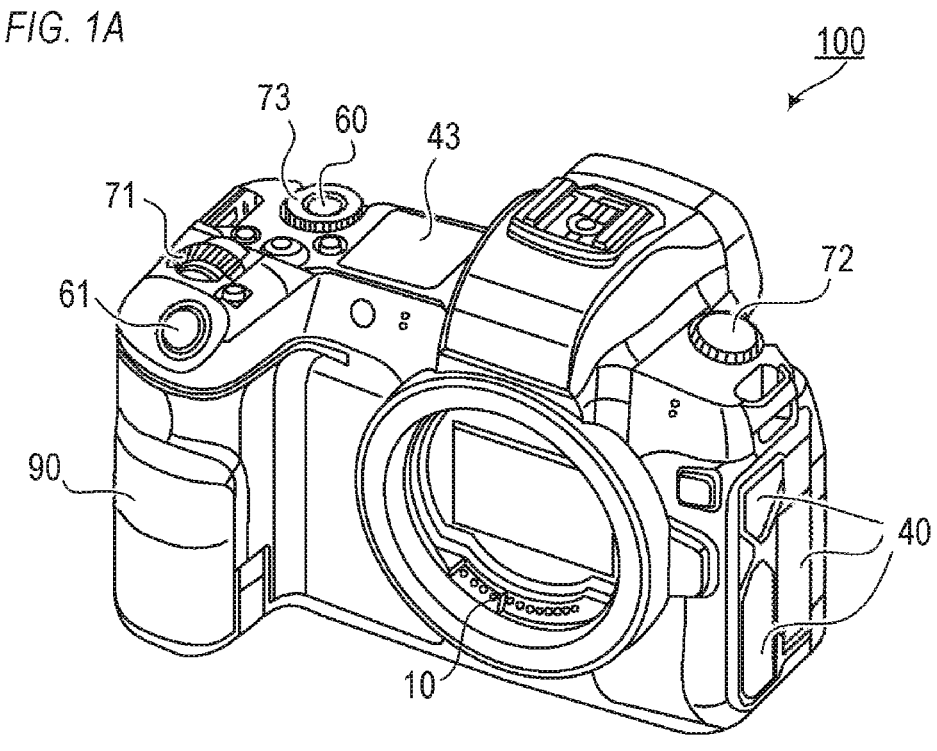
FIGS. 1A and 1B are external views of a digital camera.
Figure 1B:
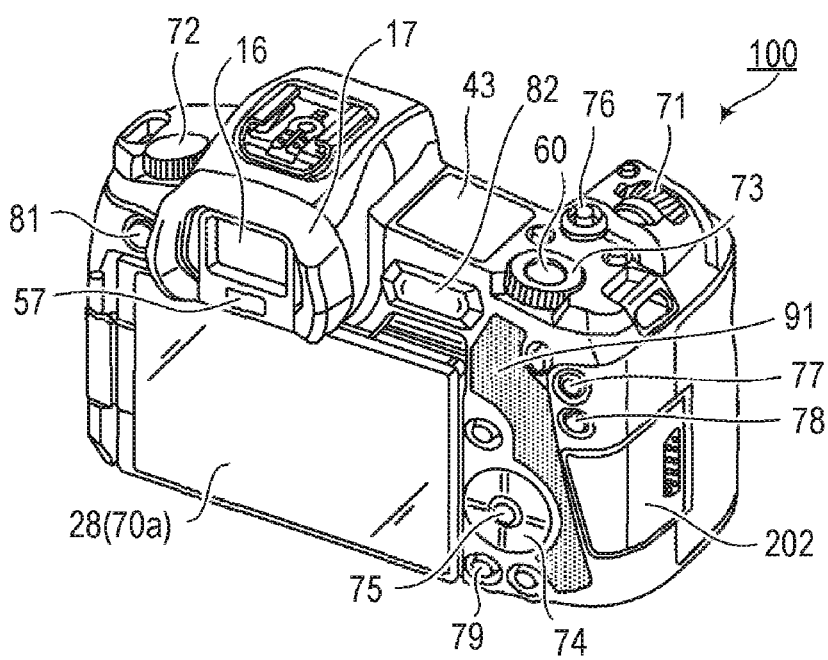

Hereinafter, embodiments of the present disclosure will be described with reference to the drawings. FIGS. 1A and 1B are external views of a digital camera 100 shown as an example of a device (imaging device) to which the present disclosure is applicable. FIG. 1A is a front-surface perspective view of the digital camera 100, and FIG. 1B is a back-surface perspective view of the digital camera 100.

A display unit 28 is a display unit provided on a back surface of the digital camera 100, and displays images or various information. A vari-angle mechanism is provided at the connecting portion between the digital camera 100 and the display unit 28, and a display surface of the display unit 28 is capable of being oriented in various directions. The display unit 28 is enabled to change a positional relationship with respect to a body unit of the digital camera 100 by the vari-angle mechanism and detect a positional relationship of the display unit 28 with respect to the body unit using a sensor not shown. A touch panel 70a is enabled to detect a touch operation on the display surface (touch operation surface) of the display unit 28. Further, a display unit 43 outside a finder is a display unit provided on a top surface of the digital camera 100, and displays various setting values of the digital camera 100, including a shutter speed or an aperture. A shutter button 61 is an operation member used to provide photographing instructions. A mode selection switch 60 is an operation member used to select various modes. A terminal cover 40 is a cover used to protect a connector (not shown) for a connection cable or the like that connects the digital camera 100 to external equipment.

A main electronic dial 71 is a rotary operation member, and enabled to perform change or the like of a setting value such as a shutter speed and an aperture when rotated. A power switch 72 is an operation member used to switch between ON and OFF states of the power of the digital camera 100. A sub-electronic dial 73 is a rotary operation member, and enabled to perform movement of a selected frame (cursor), image feeding, or the like when rotated. A four-direction key 74 is configured so that its upper, lower, left, and right portions are pressable, and enabled to perform processing corresponding to any pressed portion of the four-direction key 74. A SET button 75 is a press button, and mainly used to perform determination or the like of a selected item.

A moving-image button 76 is used to provide instructions to start or stop photographing (recording) a moving image.

An AE lock button 77 is a press button, and enabled to fix an exposed state when pressed in a photographing standby state. An enlargement button 78 is an operation member used to switch between ON and OFF states of an enlargement mode in live-view display (LV display) of a photographing mode. When the enlargement mode is turned ON and then the main electronic dial 71 is operated, enlargement or contraction of a live-view image (LV image) is enabled. In a reproduction mode, the enlargement button 78 is used to enlarge a reproduction image or increase a magnification ratio. A reproduction button 79 is an operation button used to switch between a photographing mode and the reproduction mode. By pressing the reproduction button 79 during the photographing mode, the photographing mode is switched to the reproduction mode to enable the display of the latest image among images recorded on a recording medium 200 (that will be described later) on the display unit 28. A menu button 81 is a press button used to perform an instruction operation to display a menu screen, and the menu screen enabling various settings is displayed on the display unit 28 when the menu button 81 is pressed. A user may intuitively perform various settings using the menu screen displayed on the display unit 28 and the four-direction key 74 or the SET button 75. By changing settings on the menu screen, the user is enabled to change (customize) functions allocated to operation members (such as buttons and a rotary operation member).

A touch bar 82 is a linear touch-operation member (line touch sensor) enabled to receive a touch operation. The touch bar 82 is arranged at a position (touchable position) at which the user is enabled to perform a touch operation with the thumb of a right hand while holding a grip unit 90 with the right hand (i.e., holding the grip unit 90 with the little finger, the ring finger, and the middle finger of the right hand) so as to enable pressing of the shutter button 61 with the index finger of the right hand. That is, the touch bar 82 is arranged at a position at which the user is enabled to perform an operation in a state (photographing orientation) in which the user holds the digital camera 100 up so that an eye of the user is in contact with an eyepiece unit 16 and looks into an eyepiece finder 17 to enable pressing of the shutter button 61 at all times. The touch bar 82 is a reception unit enabled to receive a tap operation (an operation of releasing the thumb of the right hand without moving from a touched position for a predetermined period of time after touching) thereon, a slide operation (an operation of moving a touched position while holding a touched state after touching) in a right-and-left direction, or the like. The touch bar 82 is an operation member different from the touch panel 70a, and does not include a display function. The touch bar 82 functions as, for example, a multi-function bar (M-Fn bar) to which various functions are allocatable.

A communication terminal 10 is a communication terminal used to perform communication with the side of a lens unit 150 (that will be described later; detachable) by the digital camera 100. The eyepiece unit 16 is an eyepiece portion of the eyepiece finder 17 (looking-into type finder). Through the eyepiece unit 16, the user is enabled to visually recognize video displayed on an internal electronic view finder (EVF) 29 (that will be described later). An eyepiece detection unit 57 is an eyepiece detection sensor used to detect whether an eye of the user (photographer) is in contact with the eyepiece unit 16. A lid 202 is a lid for a slot in which a recording medium 200 (that will be described later) is stored. A grip unit 90 is a holding unit formed into a shape easily gripped by the right hand when the user holds the digital camera 100 up. The shutter button 61 and the main electronic dial 71 are arranged at positions at which the user is enabled to perform an operation with the index finger of the right hand while holding the digital camera 100 with the grip unit 90 gripped with the little finger, the ring finger, and the middle finger of the right hand. Further, in the same state, a sub-electronic dial 73 and the touch bar 82 are arranged at positions at which the user is enabled to perform an operation with the thumb of the right hand. A thumb-rest unit 91 (thumb standby position) is a grip unit provided at a place at which the user is enabled to easily put the thumb of the right hand gripping the grip unit 90 in a state in which he/she does not operate any operation member on the back-surface side of the digital camera 100. The thumb-rest unit 91 is composed of a rubber member or the like used to increase a holding force (grip feeling).

Figure 2:
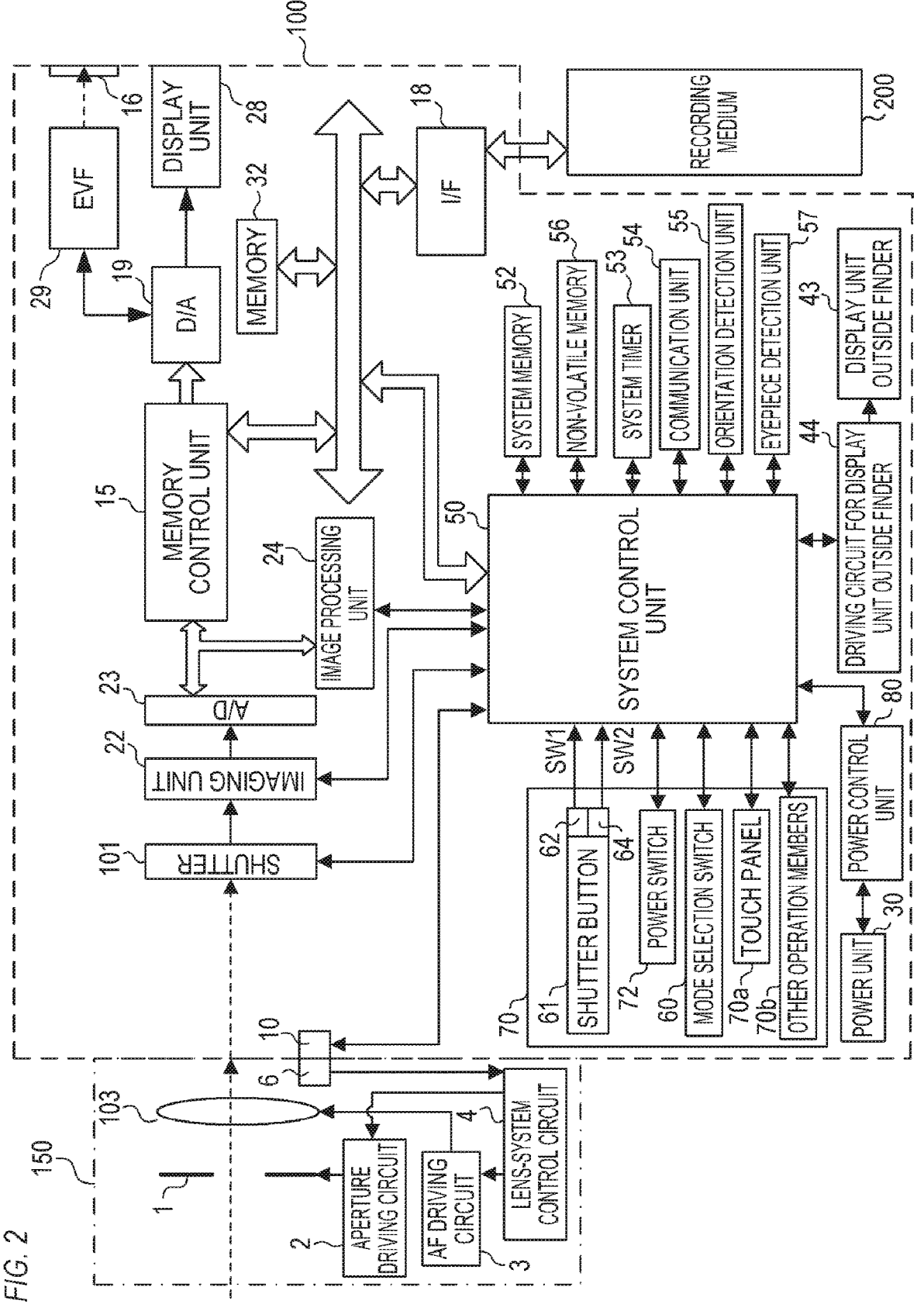
FIG. 2 is a block diagram of the digital camera.

FIG. 2 is a block diagram showing the configuration of the digital camera 100. A lens unit 150 is a lens unit in which an interchangeable photographing lens is installed. A lens 103 is generally composed of a plurality of lenses, but only one lens is shown in FIG. 2 for simplification. A communication terminal 6 is a communication terminal used by the lens unit 150 to perform communication with the side of the digital camera 100. A communication terminal 10 is a communication terminal used by the digital camera 100 to perform communication with the side of the lens unit 150. The lens unit 150 performs communication with a system control unit 50 via the communication terminals 6 and 10. Further, the lens unit 150 controls an aperture 1 via an aperture driving circuit 2 by an internal lens-system control circuit 4. Furthermore, the lens unit 150 adjusts a focus by displacing the lens 103 via an AF driving circuit 3 by a lens-system control circuit 4.

A shutter 101 is a focal-plane shutter enabled to freely control an exposure time of the imaging unit 22 according to control by the system control unit 50.

An imaging unit 22 is an imaging element (image sensor) composed of a CCD element, a CMOS element, or the like that converts an optical image into an electric signal. The imaging unit 22 may have an imaging-surface phase-difference sensor that outputs defocus-amount information to the system control unit 50. An A/D converter 23 converts an analog signal output from the imaging unit 22 into a digital signal.

An image processing unit 24 performs predetermined processing (resize processing such as pixel interpolation and contraction, color conversion processing, or the like) on data from the A/D converter 23 or data from a memory control unit 15. Further, the image processing unit 24 performs predetermined computation processing using data on a captured image, and the system control unit 50 performs exposure control or ranging control on the basis of a computation result obtained by the image processing unit 24. By this processing, automatic focus (AF) processing of a through-the-lens (TTL) system, automatic exposure (AE) processing, electronic flash pre-emission (EF) processing, or the like is performed. Moreover, the image processing unit 24 performs predetermined computation processing using data on a captured image, and performs automatic white balance (AWB) processing of a TTL system on the basis of an obtained computation result.

A memory control unit 15 controls transmission and reception of data between the A/D converter 23, the image processing unit 24, and a memory 32. Output data from the A/D converter 23 is written into the memory 32 via the image processing unit 24 and the memory control unit 15. Alternatively, output data from the A/D converter 23 is written into the memory 32 via the memory control unit 15 without being subjected to the image processing unit 24. The memory 32 stores image data that has been obtained by the imaging unit 22 and converted into digital data by the A/D converter 23 or image data that is to be displayed on the display unit 28 or the EVF 29. The memory 32 includes storage capacity enough to store a predetermined number of still images or moving images and sounds for a predetermined period of time.

Further, the memory 32 serves also as a memory (video memory) for image display. A D/A converter 19 converts image data for display stored in the memory 32 into an analog signal, and supplies the converted signal to the display unit 28 or the EVF 29. Accordingly, image data for display written into the memory 32 is displayed on the display unit 28 or the EVF 29 via the D/A converter 19. Each of the display unit 28 and the EVF 29 is a display such as an LCD and an organic EL display, and performs display according to an analog signal from the D/A converter 19. A digital signal that has been A/D-converted by the A/D converter 23 and accumulated in the memory 32 is converted into an analog signal by the D/A converter 19 and sequentially transferred to and displayed on the display unit 28 or the EVF 29, whereby live-view display (LV) is enabled. Hereinafter, an image displayed in live-view display will be called a live-view image (LV image).

The system control unit 50 is a control unit including at least one processor and/or at least one circuit, and controls the whole digital camera 100. The system control unit 50 realizes respective processing that will be described later by running a program recorded on a non-volatile memory 56. Further, the system control unit 50 also performs display control by controlling the memory 32, the D/A converter 19, the display unit 28, the EVF 29, or the like.

The system memory 52 is, for example, a RAM, and the system control unit 50 develops a constant used to operate the system control unit 50, a variable, the program read from the non-volatile memory 56, or the like into the system memory 52.

The non-volatile memory 56 is electrically erasable and recordable memory, and an EEPROM is, for example, used as such. On the non-volatile memory 56, a constant used to operate the system control unit 50, the program, or the like is recorded. Here, the program refers to a program used to run various flowcharts that will be described later.

A system timer 53 is a clocking unit that measures time used in various control or time of an embedded clock.

A communication unit 54 performs transmission and reception of a video signal or a sound signal with external equipment connected via a wireless or wired cable. The communication unit 54 is connectable also to a wireless local area network (LAN) or the Internet. Further, the communication unit 54 is communicable with external equipment through Bluetooth® or Bluetooth® Low Energy. The communication unit 54 is enabled to transmit an image (including an LV image) that has been captured by the imaging unit 22 or an image that has been recorded on the recording medium 200 and receive image data or various other information from external equipment.

An orientation detection unit 55 detects an orientation (inclination) of the digital camera 100 with respect to a gravity direction. On the basis of an orientation detected by the orientation detection unit 55, it is possible to determine whether an image photographed by the imaging unit 22 is an image that has been photographed when the digital camera 100 is held in a horizontal orientation or an image that has been photographed when the digital camera 100 is held in a vertical orientation. The system control unit 50 is enabled to add direction information corresponding to an orientation that has been detected by the orientation detection unit 55 to an image file of an image that has been captured by the imaging unit 22, or enabled to rotate and record an image. As the orientation detection unit 55, an acceleration sensor, a gyro sensor, or the like is usable. Using the acceleration sensor or the gyro sensor that serves as the orientation detection unit 55, it is also possible to detect movement (pan, tilt, lifting, standing-still, or the like) of the digital camera 100.

The eyepiece detection unit 57 is an eyepiece detection sensor that detects approach (contact) and regression (separation) of an eye (object) with respect to the eyepiece unit 16 of an eyepiece finder 17 (hereinafter simply described as a "finder"). The system control unit 50 switches between display (display state) and non-display (non-display state) of the display unit 28 and the EVF 29 according to a state detected by the eyepiece detection unit 57. More specifically, when the digital camera 100 is in at least a photographing standby state and switching of a display destination is set to automatic switching, the display unit 28 is turned ON as a display destination and the EVF 29 is hidden in a non-contacting state. Further, the EVF 29 is turned ON as a display destination and the display unit 28 is hidden in a contacting state. An infrared proximity sensor is, for example, usable as the eyepiece detection unit 57, and enabled to detect approach of any object toward the eyepiece unit 16 of the finder 17 including the EVF 29. When an object approaches the eyepiece unit 16, infrared light projected from a projection unit (not shown) of the eyepiece detection unit 57 is reflected by the object and received by a light-receiving unit (not shown) of the infrared proximity sensor. Depending on an amount of the received infrared light, a distance (contact distance) from the object to the eyepiece unit 16 is discriminable. As described above, the eyepiece detection unit 57 performs eyepiece detection to detect a proximity distance of an object with respect to the eyepiece unit 16. When an object approaching the eyepiece unit 16 within a predetermined distance is detected in a non-contacting state (non-approaching state), the eyepiece detection unit 57 detects the contact of the object. On the other hand, when the object having approached the eyepiece unit 16 is separated by at least a predetermined distance in a contacting state (approaching state), the eyepiece detection unit 57 detects the separation of the object. A threshold used to detect the contact and a threshold used to detect the separation may be different from each other by, for example, setting hysteresis or the like. Further, after detection of the contact, it is assumed that the contacting state is maintained until the separation has been detected. After detection of the separation, it is assumed that the non-contacting state is maintained until the contact has been detected. Note that the infrared proximity sensor is given only as an example, and any sensor may be employed as the eyepiece detection unit 57 so long as it is capable of detecting a state that is regarded as contact.

Further, the system control unit 50 detects a positioning state of the display unit 28 on the basis of the output of the sensor (not shown) used to detect the positional relationship of the display unit 28 with respect to the body unit of the digital camera 100. Therefore, the system control unit 50 is enabled to detect a direction in which the display surface of the display unit 28 is oriented.

On the display unit 43 outside the finder, various setting values of the camera including a shutter speed, an aperture, or the like are displayed via a driving circuit 44 for the display unit outside the finder.

A power control unit 80 is composed of a battery detection circuit, a DC-DC converter, a switch circuit that switches a block to be energized, or the like, and detects the presence or absence of the installation of a battery, a battery type, a battery remaining amount, or the like. Further, the power control unit 80 controls the DC-DC converter on the basis of the result of the detection and instructions from the system control unit 50, and supplies a required voltage to respective units including the recording medium 200 for a required period of time. A power unit 30 is composed of a primary battery such as an alkali battery and a lithium battery, a secondary battery such as an Nicd battery, an NiMH battery, and an Li battery, an AC adapter, or the like.

A recording medium I/F 18 is an interface with the recording medium 200 such as a memory card and a hard disk. The recording medium 200 is a recording medium such as a memory card used to record a captured image, and composed of a semiconductor memory, a magnetic disk, or the like.

An operation unit 70 is an input unit that receives an operation (user operation) from the user, and used to input various operation instructions to the system control unit 50. As shown in FIG. 2, the operation unit 70 includes the mode selection switch 60, the shutter button 61, the power switch 72, the touch panel 70a, other operation members 70b, or the like. The operation members 70b include the main electronic dial 71, the sub-electronic dial 73, the four-direction key 74, the SET button 75, the moving-image button 76, the AE lock button 77, the enlargement button 78, the reproduction button 79, the menu button 81, the touch bar 82, or the like.

The mode selection switch 60 switches an operation mode of the system control unit 50 to any of a still-image photographing mode, a moving-image photographing mode, a reproduction mode, or the like. The still-image photographing mode includes an automatic photographing mode, an automatic scene determination mode, a manual mode, an aperture priority mode (Av mode), a shutter-speed priority mode (Tv mode), and a program AE mode (P mode). Further, the still-image photographing mode also includes a various-scenes mode used to perform photographing settings for each photographing scene, a custom mode, or the like. With the mode selection switch 60, the user is enabled to directly switch the operation mode to any of the modes described above. Alternatively, after temporarily switching to a list screen of the photographing modes with the mode selection switch 60, the user may select any of the plurality of the displayed modes using another operation member. Similarly, the moving-image photographing mode may also include a plurality of modes.

The shutter button 61 has a first shutter switch 62 and a second shutter switch 64. The first shutter switch 62 is turned ON halfway through an operation of the shutter button 61, i.e., half-pressing (photographing preparation instructions), and outputs a first shutter switch signal SW1. The system control unit 50 starts a photographing preparation processing operation such as AF processing, AE processing, AWB processing, and EF processing according to the first shutter switch signal SW1. The second shutter switch 64 is turned ON when the operation of the shutter button 61 is completed, i.e., full-pressing (photographing instructions), and outputs a second shutter switch signal SW2. The system control unit 50 starts a series of photographing processing operations from reading of a signal from the imaging unit 22 to writing of a captured image into the recording medium 200 as an image file according to the second shutter switch signal SW2.

The touch panel 70a is a touch sensor that detects various touch operations on the display surface of the display unit 28 (an operation surface of the touch panel 70a). The touch panel 70a and the display unit 28 may be integrally configured. For example, the touch panel 70a is configured to have such light transmittance that display of the display unit 28 is not disturbed, and attached to an upper layer of the display surface of the display unit 28. Further, input coordinates in the touch panel 70a and display coordinates on the display surface of the display unit 28 are associated with each other. Thus, a graphical user interface (GUI) that makes the user feel as if he/she were capable of directly operating a screen displayed on the display unit 28 is enabled.

The system control unit 50 is enabled to detect the following operations or states on the touch panel 70a.

A state in which a finger or a pen that has not touched the touch panel 70a newly touches the touch panel 70a, i.e., the start of a touch (hereinafter called touch-down).

A state in which the touch panel 70a is touched by a finger or a pen (hereinafter called touch-on).

A state in which a finger or a pen moves while touching the touch panel 70a (hereinafter called touch-move).

A state in which a finger or a pen that has touched the touch panel 70a is separated (released) from the touch panel 70a, i.e., the end of a touch (hereinafter called touch-up).

A state in which the touch panel 70a is not touched (hereinafter called touch-off).

The touch-on is detected simultaneously when the touch-down is detected. Generally, the touch-on is continuously detected unless the touch-up is detected after the touch-down. The touch-on is also continuously detected when the touch-move is detected. Even if the touch-on has been detected, the touch-move is not detected unless a touch position has been moved. After the touch-up of all touched fingers or a pen is detected, the touch-off is detected.

Via an internal bus, the system control unit 50 is notified of these operations and states or position coordinates at which a finger or a pen has touched the touch panel 70a. On the basis of notified information, the system control unit 50 determines what operation (touch operation) has been performed on the touch panel 70a. For the touch-move, the system control unit 50 is also enabled to determine a movement direction of a finger or a pen that moves on the touch panel 70a for each of a vertical component and a horizontal component on the touch panel 70a on the basis of changes of position coordinates. The system control unit 50 determines that a slide operation has been performed when detecting the touch-move by at least a prescribe distance. An operation of quickly moving a finger by a certain distance while touching the touch panel 70a and then releasing the same will be called a flick. In other words, the flick is an operation of quickly tracing the touch panel 70a so as to be flipped with a finger. The system control unit 50 is enabled to determine that the flick has been performed when detecting that the touch-move has been performed by at least a predetermined distance and at least at a predetermined speed and then the touch-up has been performed in succession to the touch-move (the flick has been performed in succession to the slide operation). Moreover, a touch operation of simultaneously touching a plurality of places (for example, two points) (multi-touch) and making the touched positions get close to each other will be called pinch-in, and a touch operation of making the touched positions get away from each other will be called pinch-out. The pinch-out and the pinch-in will be generically called a pinch operation (or simply a pinch). The touch panel 70a may be any of the various types of touch panels such as a resistance-film type, a capacitance type, a surface acoustic type, an infrared type, an electromagnetic induction type, an image recognition type, and an optical sensor type. There are a type that detects a touch operation when the touch panel 70a has been touched and a type that detects a touch operation when a finger or a pen has approached the touch panel 70a, but any of the types may be used.

Further, the system control unit 50 is enabled to detect the following operations or states on the touch bar 82.

A state in which a finger that has not touched the touch bar 82 newly touches the touch bar 82, i.e., the start of a touch (hereinafter called touch-down).

A state in which the touch bar 82 is touched by a finger (hereinafter called touch-on).

A state in which a finger moves while touching the touch bar 82 (hereinafter called touch-move).

A state in which a finger that has touched the touch bar 82 is separated (released) from the touch bar 82, i.e., the end of a touch (hereinafter called touch-up).

A state in which the touch bar 82 is not touched (hereinafter called touch-off).

The touch-on is detected simultaneously when the touch-down is detected. Generally, the touch-on is continuously detected unless the touch-up is detected after the touch-down. The touch-on is also continuously detected when the touch-move is detected. Even if the touch-on has been detected, the touch-move is not detected unless a touch position has been moved. After the touch-up of a touched finger is detected, the touch-off is detected.

Via the internal bus, the system control unit 50 is notified of these operations and states or position coordinates at which a finger has touched the touch bar 82, and determines what operation (touch operation) has been performed on the touch bar 82 on the basis of notified information. For the touch-move, the system control unit 50 detects movement in a horizontal direction (right-and-left direction) on the touch bar 82. The system control unit 50 determines that a slide operation has been performed when detecting movement of a touched position by at least a prescribe distance (movement by at least a predetermined amount). The system control unit 50 determines that a tap operation has been performed when a finger has touched the touch bar 82 and then separated within a predetermined time without performing a slide operation. The touch bar 82 is a touch sensor of a capacitance type in the present embodiment. However, the touch bar 82 may be a touch sensor of another type such as a resistance-film type, a surface acoustic type, an infrared type, an electromagnetic induction type, an image recognition type, and an optical sensor type.

Further, the system control unit 50 is also enabled to detect a touch-hold on the touch bar 82 (an operation of touching the touch bar 82 with a finger and continuously performing the touch-on for a long time of at least a predetermined time without performing a slide operation; an operation of continuously pressing the touch bar 82).

Figures 3A, 3B:
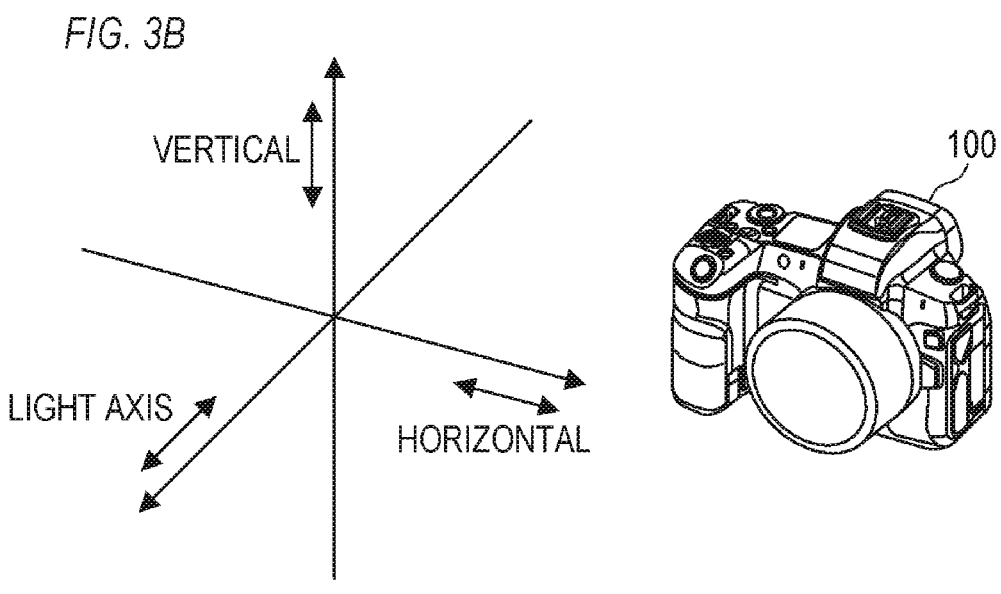
FIGS. 3A and 3B are diagrams each showing vibrations of the digital camera.

Electronic shake correction will be described. As shown in FIG. 3A, vibrations (angular vibrations) in a YAW direction, a PITCH direction, and a ROLL direction may be caused in the digital camera 100 during use. As shown in FIG. 3B, vibrations (shift vibrations and parallel vibrations) in a horizontal direction, a vertical direction, and a light-axis direction may also be caused in the digital camera 100 during use. Then, deformations such as translation (horizontal/vertical), rotation, tilt (horizontal/vertical), enlargement/contraction, and shearing may be caused by these vibrations as shown in FIGS. 3C to 3H. The electronic shake correction is image processing to reduce these deformations.

In the electronic shake correction, deformations caused in a captured image are decomposed into, for example, a plurality of deformations such as translation (horizontal/vertical), rotation, tilt (horizontal/vertical), enlargement/contraction, and shearing. Then, the respective deformations are subjected to filtering processing to calculate a projective conversion matrix (homography matrix), and the captured image is corrected using the projective conversion matrix. Accordingly, a photographing angle of view (a range of a recording target in the captured image, i.e., a photographing range) is needed to be narrowed to perform the electronic shake correction.

Figure 3I:
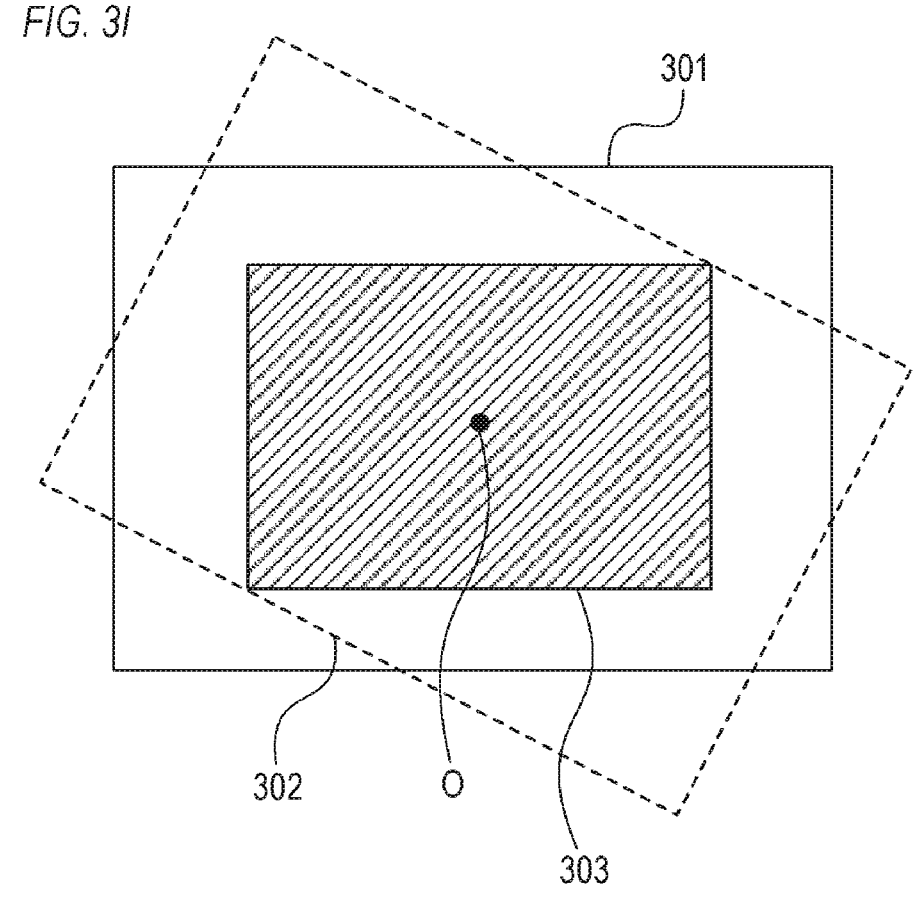
FIG. 3I is a diagram showing electronic shake correction.

FIG. 31 shows an example of the electronic shake correction in a case where the digital camera 100 rotates about a light axis. In FIG. 3I, a solid line 301 shows the contour of a captured image. In order to prevent rotation of the captured image (rotation of an object in the captured image) due to rotation of the digital camera 100, correction to rotate the captured image with a center O of the captured image as a center is performed. A broken line 302 shows the contour of the captured image after the correction. In a case where the same range as a range of the captured image before the correction is set as a photographing angle of view, no image exists at four corners of the photographing angle of view. Therefore, a range 303 (a range narrower than the range of the captured image before the correction) shown by an oblique-line section in FIG. 31 is needed to be set as the photographing angle of view. In a case where deformations other than rotation are caused in the captured image as well, the photographing angle of view is needed to be narrowed similarly.

Figure 4G:
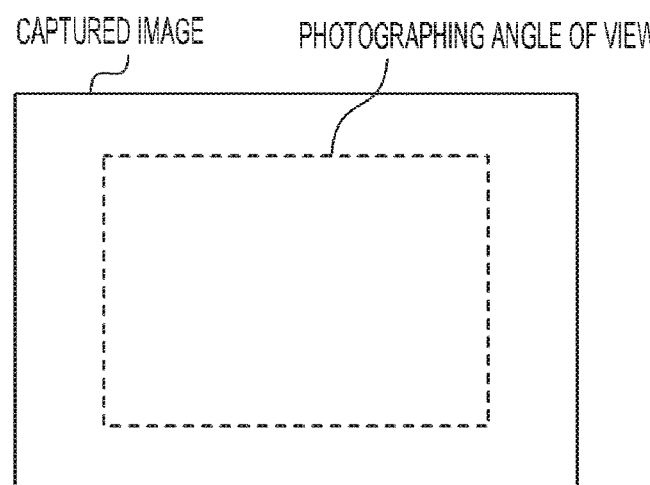
FIGS. 4G to 4I are diagrams each showing a photographing angle of view.
Figure 4H:
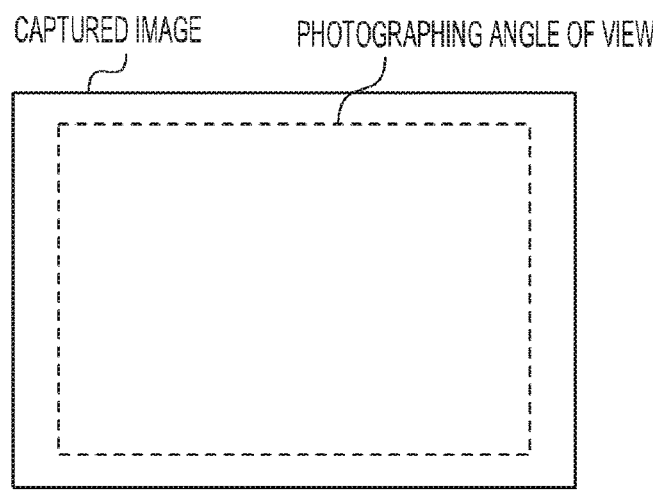
Figure 4I:
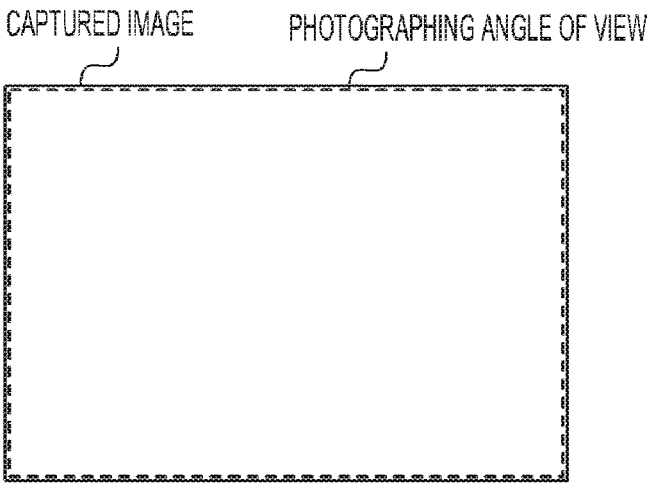

Using FIG. 4A to FIG. 9, a normal moving-image photographing mode in which a photographing angle of view is not narrowed and a moving-image photographing mode (hand-shake correction mode) in which the photographing angle of view is narrowed will be described. Each of FIGS. 4A to 4F shows an example of a screen displayed on the display unit 28. Each of FIGS. 4G to 4I shows an example of the photographing angle of view. FIGS. 5 to 9 are flowcharts of various processing.

Figure 5:
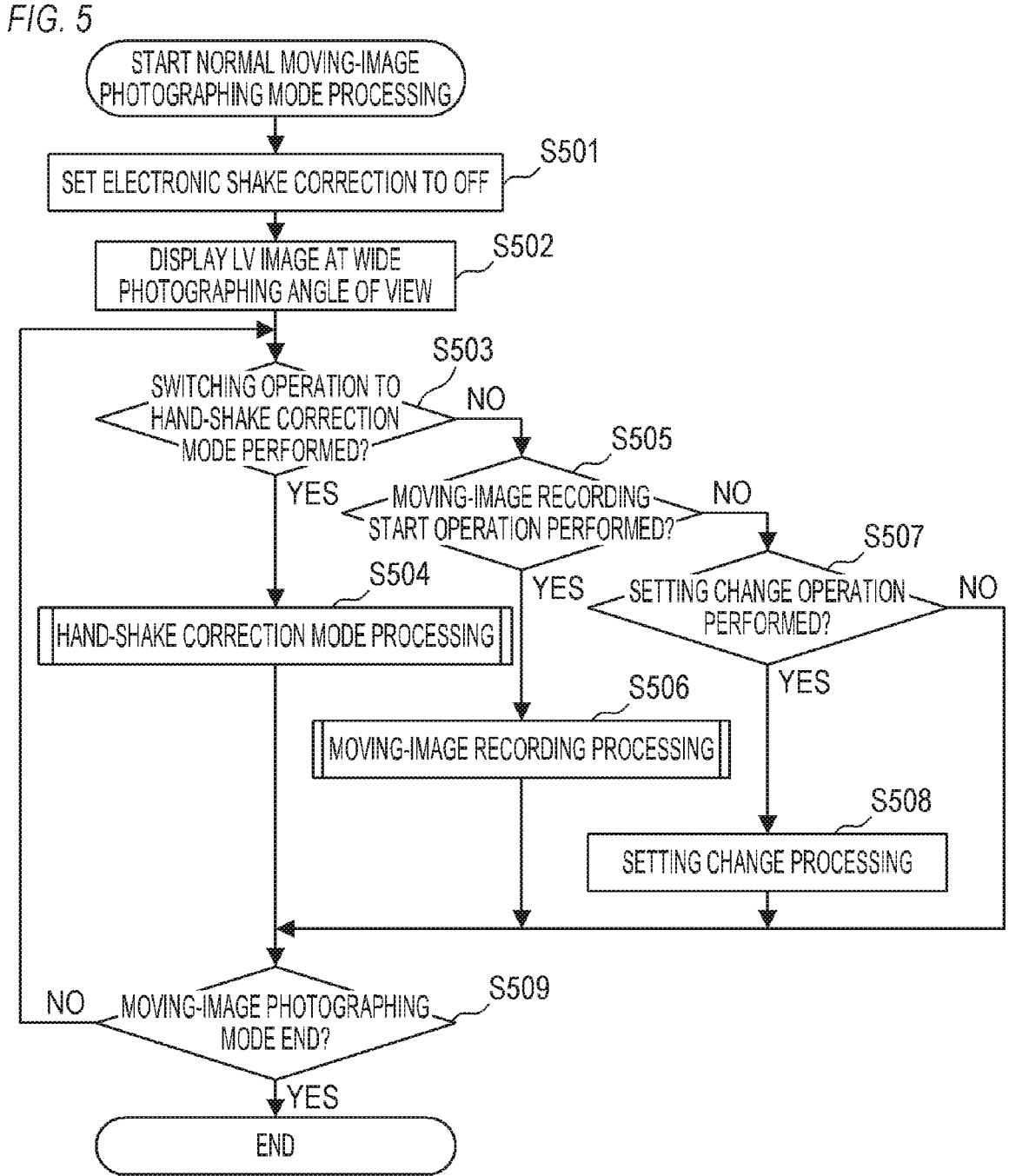
FIG. 5 is a flowchart of normal moving-image photographing mode processing.

FIG. 5 is a flowchart of normal moving-image photographing mode processing. The processing is realized when the system control unit 50 develops the program stored in the non-volatile memory 56 into the system memory 52 and runs the developed program. The system control unit 50 starts the normal moving-image photographing mode processing of FIG. 5 upon setting of a normal moving-image photographing mode according to instructions from a user.

In S501, the system control unit 50 changes the setting of the electronic shake correction to OFF. The OFF is a setting with which the electronic shake correction is not performed.

In S502, the system control unit 50 displays a live-view image on the display unit 28 at a wide photographing angle of view. As shown in, for example, FIG. 4I, the same range as a range of a captured image is set as the photographing angle of view. Then, the whole captured image is displayed as the live-view image without performing processing to crop (extract) an image in a partial range from the captured image.

After S502, the screen shown in FIG. 4A is, for example, displayed on the display unit 28. On the screen of FIG. 4A, items 411 to 416 are displayed. The item 411 is an item showing a current photographing mode (normal moving-image photographing mode), and is a touch-operable item. When the item 411 is touched, a photographing mode is switched to the hand-shake correction mode. The item 412 shows a moving-image photographable time. The items 413 and 414 are touch-operable items. When the item 413 is touched, the screen displayed on the display unit 28 transitions to a quick-menu screen used to change various settings relating to moving-image photographing. The user is enabled to change, for example, resolution and a frame rate of a moving-image to be recorded from the quick-menu screen. When the item 414 is touched, recording of a moving image is started. The item 415 is an item showing the current setting (OFF) of the electronic shake correction, and is a touch-operable item. When the item 415 is touched, the setting of the electronic shake correction is changed. The item 416 shows resolution and a frame rate of a moving image to be recorded.

In S503, the system control unit 50 determines whether a user operation (switching operation to the hand-shake correction mode) to switch the photographing mode to the hand-shake correction mode has been performed. The switching operation to the hand-shake correction mode may be a touch operation of the item 411 or a user operation using the quick-menu screen displayed by touching the item 413. The system control unit 50 proceeds to S504 when the switching operation to the hand-shake correction mode has been performed. Otherwise, the system control unit 50 proceeds to S505.

In S504, the system control unit 50 performs hand-shake correction mode processing. The details of the hand-shake correction mode processing will be described later using FIGS. 6 and 7.

In S505, the system control unit 50 determines whether a user operation (moving-image recording start operation) to start recording of a moving image has been performed. The moving-image recording start operation is, for example, a touch operation of the item 414. The system control unit 50 proceeds to S506 when the moving-image recording start operation has been performed. Otherwise, the system control unit 50 proceeds to S507.

In S506, the system control unit 50 performs moving-image recording processing. The details of the moving-image recording processing will be described later using FIG. 8.

In S507, the system control unit 50 determines whether a user operation (setting change operation) to change settings relating to moving-image photographing has been performed. The setting change operation is, for example, a user operation using the quick-menu screen displayed by touching the item 413. However, the user operation to switch the photographing mode to the hand-shake correction mode is not included in the setting change operation of S507. The setting change operation of S507 is, for example, a user operation to change at least one of resolution and a frame rate of a moving image to be recorded. The system control unit 50 proceeds to S508 when the setting change operation has been performed. Otherwise, the system control unit 50 proceeds to S509.

In S508, the system control unit 50 performs setting change processing. In the setting change processing, at least one of resolution and a frame rate of a moving image to be recorded is, for example, changed. When at least one of the resolution and the frame rate is changed, the display of the item 416 is also changed.

In S509, the system control unit 50 determines whether to end the moving-image photographing mode. For example, when a user operation to switch the photographing mode from the moving-image photographing mode to the reproduction mode or the still-image photographing mode has been performed using the mode selection switch 60, the system control unit 50 determines the end of the moving-image photographing mode. When ending the moving-image photographing mode, the system control unit 50 ends the normal moving-image photographing mode processing of FIG. 5. Otherwise, the system control unit 50 proceeds to S503.

Figure 6:
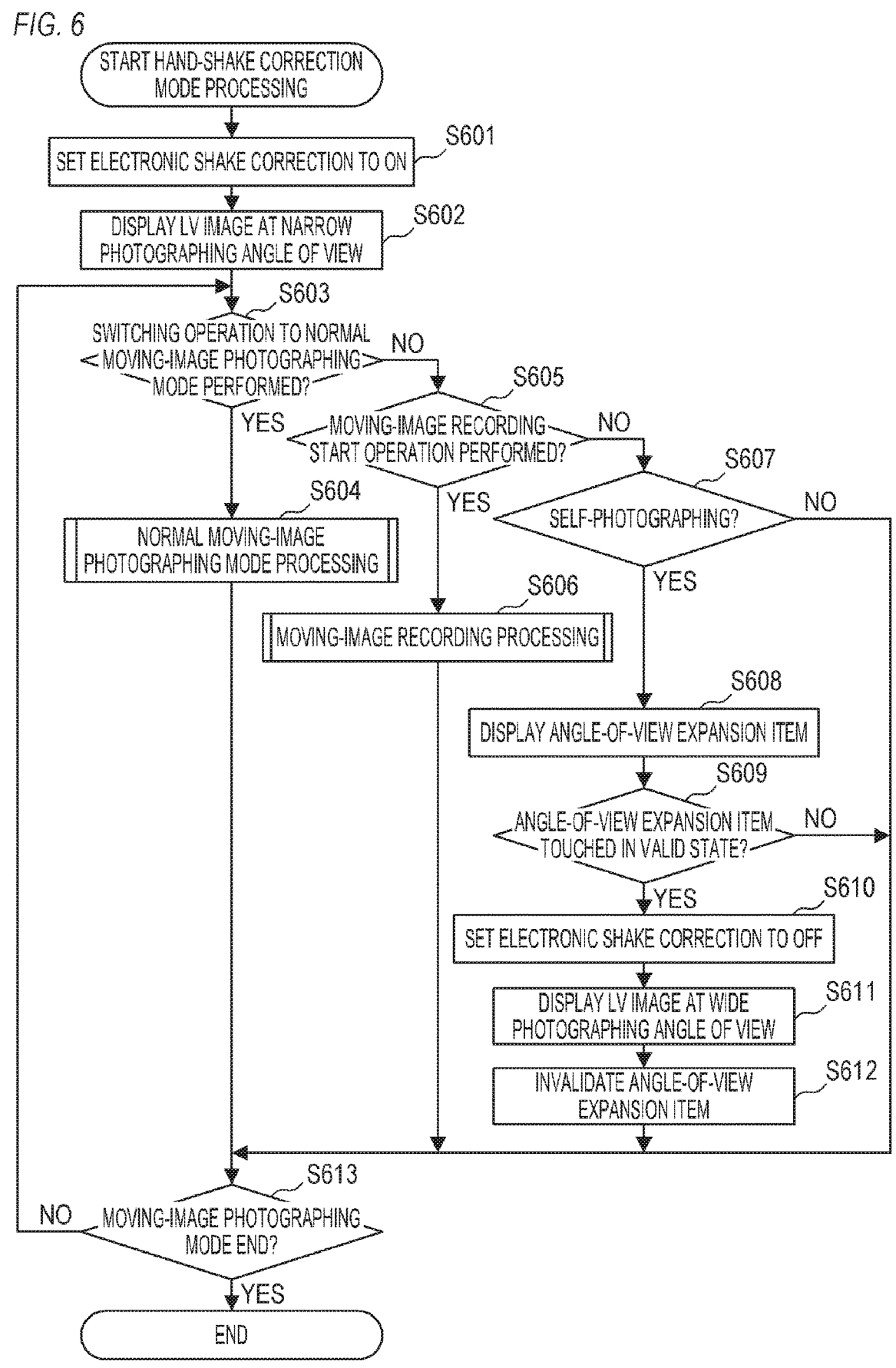
FIG. 6 is a flowchart of hand-shake correction mode processing.

FIG. 6 is a flowchart of the hand-shake correction mode processing. The processing is realized when the system control unit 50 develops the program stored in the non-volatile memory 56 into the system memory 52 and runs the developed program.

In S601, the system control unit 50 changes the setting of the electronic shake correction to ON. The ON is a setting with which the electronic shake correction is performed. The intensity of the electronic shake correction is not particularly limited, but it is assumed that the setting of the electronic shake correction is changed to ON (high) in the present embodiment.

In S602, the system control unit 50 displays a live-view image on the display unit 28 at a narrow photographing angle of view. As shown in, for example, FIG. 4G, a range narrower than a range of a captured image is set as a photographing angle of view. Then, processing to crop (extract) an image in a partial range (the photographing angle of view) from the captured image is performed, and a part of the captured image (the image of the photographing angle of view) is displayed as the live-view image.

After S602, the screen shown in FIG. 4B is, for example, displayed on the display unit 28. On the screen of FIG. 4B, an item 421 is displayed instead of the item 411 of FIG. 4A, and an item 425 is displayed instead of the item 415 of FIG. 4A. Further, the items 412, 413, 414, and 416 are also displayed on the screen of FIG. 4B like FIG. 4A. The item 421 is an item showing a current photographing mode (hand-shake correction mode), and is a touch-operable item. When the item 421 is touched, the photographing mode is switched to the normal moving-image photographing mode. The item 425 is an item showing the current setting (ON) of the electronic shake correction, and is a touch-operable item. When the item 425 is touched, the setting of the electronic shake correction is changed.

In S603, the system control unit 50 determines whether a user operation (switching operation to the normal moving-image photographing mode) to switch the photographing mode to the normal moving-image photographing mode has been performed. The switching operation to the normal moving-image photographing mode may be a touch operation of the item 421 or a user operation using the quick-menu screen displayed by touching the item 413. The system control unit 50 proceeds to S604 when the switching operation to the normal moving-image photographing mode has been performed. Otherwise, the system control unit 50 proceeds to S605.

In S604, the system control unit 50 performs the normal moving-image photographing mode of FIG. 5.

In S605, the system control unit 50 determines whether the user operation (moving-image recording start operation) to start recording of a moving image has been performed like S505 of FIG. 5. The system control unit 50 proceeds to S606 when the moving-image recording start operation has been performed. Otherwise, the system control unit 50 proceeds to S607.

In S606, the system control unit 50 performs the moving-image recording processing like S506 of FIG. 5. The details of the moving-image recording processing will be described later using FIGS. 8 and 9.

In S607, the system control unit 50 determines whether the display surface of the display unit 28 (the operation surface of the touch panel 70*a*) has been oriented from a photographer side to an object side (imaging direction side). The determination may be interpreted as determination as to whether an imaging direction of the imaging unit 22 has become substantially equal to a display direction of the display unit 28 or determination as to whether a state (condition) to perform self-photographing has been created. The system control unit 50 proceeds to S608 when the display surface of the display unit 28 has been oriented to the object side (when the imaging direction of the imaging unit 22 has become substantially equal to the display direction of the display unit 28, i.e., when the state to perform the self-photographing has been created). Otherwise, the system control unit 50 proceeds to S613.

In S608, the system control unit 50 displays an item (an angle-of-view expansion item) for enabling instructions to intuitively and immediately expand the photographing angle of view on the display unit 28. For example, an item 437 is displayed as shown in FIG. 4C. The item 437 is displayed at an end of the screen so as not to hinder confirmation of the live-view image (displayed overlapping an end of the live-view image).

In S609, the system control unit 50 determines whether the angle-of-view expansion item has been touched in a state in which a touch operation on the angle-of-view expansion item (item 437) displayed in S608 is valid. The system control unit 50 proceeds to S610 when the angle-of-view expansion item has been touched in the state in which the touch operation on the angle-of-view expansion item is valid. Otherwise, the system control unit 50 proceeds to S613.

In S610, the system control unit 50 changes the setting of the electronic shake correction to OFF like S501 of FIG. 5.

In S611, the system control unit 50 displays the live-view image on the display unit 28 at a wide photographing angle of view like S502 of FIG. 5.

In S612, the system control unit 50 invalidates the touch operation on the angle-of-view expansion item.

After S612, the screen shown in FIG. 4E is, for example, displayed on the display unit 28. On the screen of FIG. 4E, the item 415 is displayed instead of the item 425 of FIG. 4C, and an item 457 is displayed instead of the item 437 of FIG. 4C. Further, the items 421, 412, 413, 414, and 416 are also displayed on the screen of FIG. 4E like FIG. 4C. Since the current setting of the electronic shake correction is OFF, the item 415 is displayed. The item 457 is the same item (angle-of-view expansion item) as the item 437 of FIG. 4C but displayed in a (gray-out) state in which a touch operation is invalid.

When the touch operation on the angle-of-view expansion item is continuously valid and the photographing angle of view is switched between a narrow angle and a wide angle every time the angle-of-view expansion item is touched, there is a likelihood that the user loses a photographing opportunity due to a false operation. For example, there is a case that the user falsely touches the same position twice when touching the item 437 on the screen of FIG. 4C to expand the photographing angle of view. In such a case, the screen of FIG. 4C appears again after transitioning to the screen of FIG. 4E, and the user loses a photographing opportunity. In the present embodiment, the touch operation on the angle-of-view expansion item is invalidated with the photographing angle of view expanded to make the photographing angle of view not easily narrowed and prevent the user from losing a photographing opportunity.

In S613, the system control unit 50 determines whether to end the moving-image photographing mode like S509 of FIG. 5. The system control unit 50 ends the hand-shake correction mode processing of FIG. 6 when ending the moving-image photographing mode. Otherwise, the system control unit 50 proceeds to S603.

FIG. 7 is a flowchart of another hand-shake correction mode processing. The processing is realized when the system control unit 50 develops the program stored in the non-volatile memory 56 into the system memory 52 and runs the developed program. In S504 of FIG. 5, the hand-shake correction mode processing of FIG. 6 or FIG. 7 is performed.

The processing of S701 to S706 is the same as the processing of S601 to S606 of FIG. 6. The system control unit 50 proceeds from S705 to S706 when a moving-image recording start operation has been performed. Otherwise, the system control unit 50 proceeds to S707.

In S707, the system control unit 50 determines whether a relative direction of the display surface of the display unit 28 (the operation surface of the touch panel 70*a*) with respect to a direction of the digital camera 100 (a direction of the imaging unit 22) has been changed. The system control unit 50 proceeds to S708 when the direction of the display surface has been changed. Otherwise, the system control unit 50 proceeds to S714.

In S708, the system control unit 50 determines whether the display surface of the display unit 28 (the operation surface of the touch panel 70*a*) has been oriented from a photographer side to an object side (imaging direction side) like S607 of FIG. 6. As described above, the determination may be interpreted as determination as to whether an imaging direction of the imaging unit 22 has become substantially equal to a display direction of the display unit 28 or determination as to whether a state (condition) to perform self-photographing has been created. The system control unit 50 proceeds to S709 when the display surface of the display unit 28 has been oriented to the object side (when the imaging direction of the imaging unit 22 has become substantially equal to the display direction of the display unit 28, i.e., when the state to perform the self-photographing has been created). Otherwise, the system control unit 50 proceeds to S712.

In S709, the system control unit 50 determines whether a captured image includes a face region (a region of a face) larger than a predetermined size. The system control unit 50 proceeds to S710 when the captured image includes the face region larger than the predetermined size. Otherwise, the system control unit 50 proceeds to S714. The face region larger than the predetermined size is, for example, a face region that does not fall within a narrow photographing angle of view in a case where the setting of electronic shake correction is ON (high).

In S710, the system control unit 50 changes the setting of the electronic shake correction to OFF like S501 of FIGS. 5 and S610 of FIG. 6.

In S711, the system control unit 50 displays a live-view image on the display unit 28 at a wide photographing angle of view like S502 of FIGS. 5 and S611 of FIG. 6.

When the captured image does not include the face region larger than the predetermined size in the state in which the self-photographing is performed, it is assumed that a user and a background are substantially included in the narrow photographing angle of view. When the captured image includes the face region larger than the predetermined size in the state in which the self-photographing is performed, it is assumed that the background is not substantially included in the narrow photographing angle of view and therefore the wide photographing angle of view is needed to be set.

According to S709 to S711, the setting of the electronic shake correction is kept ON (high), and the narrow photographing angle of view is maintained even in the state in which the self-photographing is performed when the captured image does not include the face region larger than the predetermined size. When the captured image includes the face region larger than the predetermined size, the setting of the electronic shake correction is changed to OFF, and the photographing angle of view is expanded in the state in which the self-photographing is performed.

After S711, the same screen as the screen of FIG. 4E is, for example, displayed on the display unit 28. A screen obtained by removing the item 457 from the screen of FIG. 4E may also be displayed. When the captured image does not include the face region larger than the predetermined size and the system control unit 50 proceeds from S709 to S714, the same screen as the screen of FIG. 4C is, for example, displayed on the display unit 28. A screen obtained by removing the item 437 from the screen of FIG. 4C may also be displayed. On the screen of FIG. 4C, a live-view image includes a large face region. However, a live-view image substantially including the user and the background is displayed when the system control unit 50 proceeds from S709 to S714.

In S712, the system control unit 50 changes the setting of the electronic shake correction to ON (high) like S701 and S601 of FIG. 6.

In S713, the system control unit 50 displays a live-view image on the display unit 28 at a narrow photographing angle of view like S702 and S602 of FIG. 6. After S713, the same screen as the screen of FIG. 4B is, for example, displayed on the display unit 28.

In S714, the system control unit 50 determines whether to end the moving-image photographing mode like S509 of FIGS. 5 and S613 of FIG. 6. The system control unit 50 ends the hand-shake correction mode processing of FIG. 7 when ending the moving-image photographing mode. Otherwise, the system control unit 50 proceeds to S703.

Figure 8:
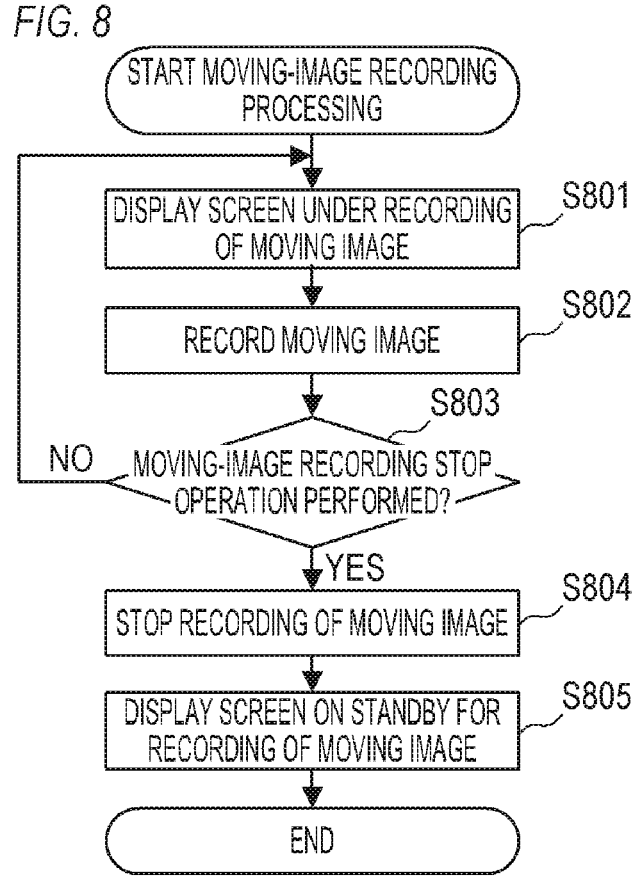
FIG. 8 is a flowchart of moving-image recording processing.

FIG. 8 is a flowchart of the moving-image recording processing. The processing is realized when the system control unit 50 develops the program stored in the nonvolatile memory 56 into the system memory 52 and runs the developed program.

In S801, the system control unit 50 displays a screen under recording of a moving image on the display unit 28. On the screen under the recording of the moving image as well, a live-view image is displayed at a set photographing angle of view.

After S801, the screen shown in FIG. 4F is, for example, displayed on the display unit 28. It is assumed that the hand-shake correction mode has been set in FIG. 4F. Therefore, the item 421 showing the hand-shake correction mode is displayed on the screen of FIG. 4F. When the normal moving-image photographing mode has been set, the item 411 showing the normal moving-image photographing mode is displayed instead of the item 421. On the screen of FIG. 4F, an item 462 is displayed instead of the item 412, and an item 464 is displayed instead of the item 414. The item 462 shows a moving-image photographing time. The item 464 is a touch-operable item, and recording of a moving image is stopped when the item 464 is touched. On the screen of FIG. 4F, an item 468 (for example, at least one of a "REC" icon and a red frame surrounding the screen) showing a state during recording of a moving image is also displayed. On the screen of FIG. 4F, the item 413 is also displayed. Items (for examples, the items 415, 416, 425, 437, and 457) not needed during recording of a moving image are hidden.

In S802, the system control unit 50 records the moving image at the photographing angle of view on the recording medium 200.

In S803, the system control unit 50 determines whether a user operation (moving-image recording stop operation) to stop recording of the moving image has been performed. The moving-image recording stop operation is, for example, a touch of the item 464. The system control unit 50 proceeds to S804 when the moving-image recording stop operation has been performed. Otherwise, the system control unit 50 proceeds to S801.

In S804, the system control unit 50 stops the recording of the moving image on the recording medium 200.

In S805, the system control unit 50 displays a screen on standby for recording of a moving image on the display unit 28. The screen on standby for the recording of the moving image includes, for example, the screens of FIGS. 4A to 4E.

Figure 9:
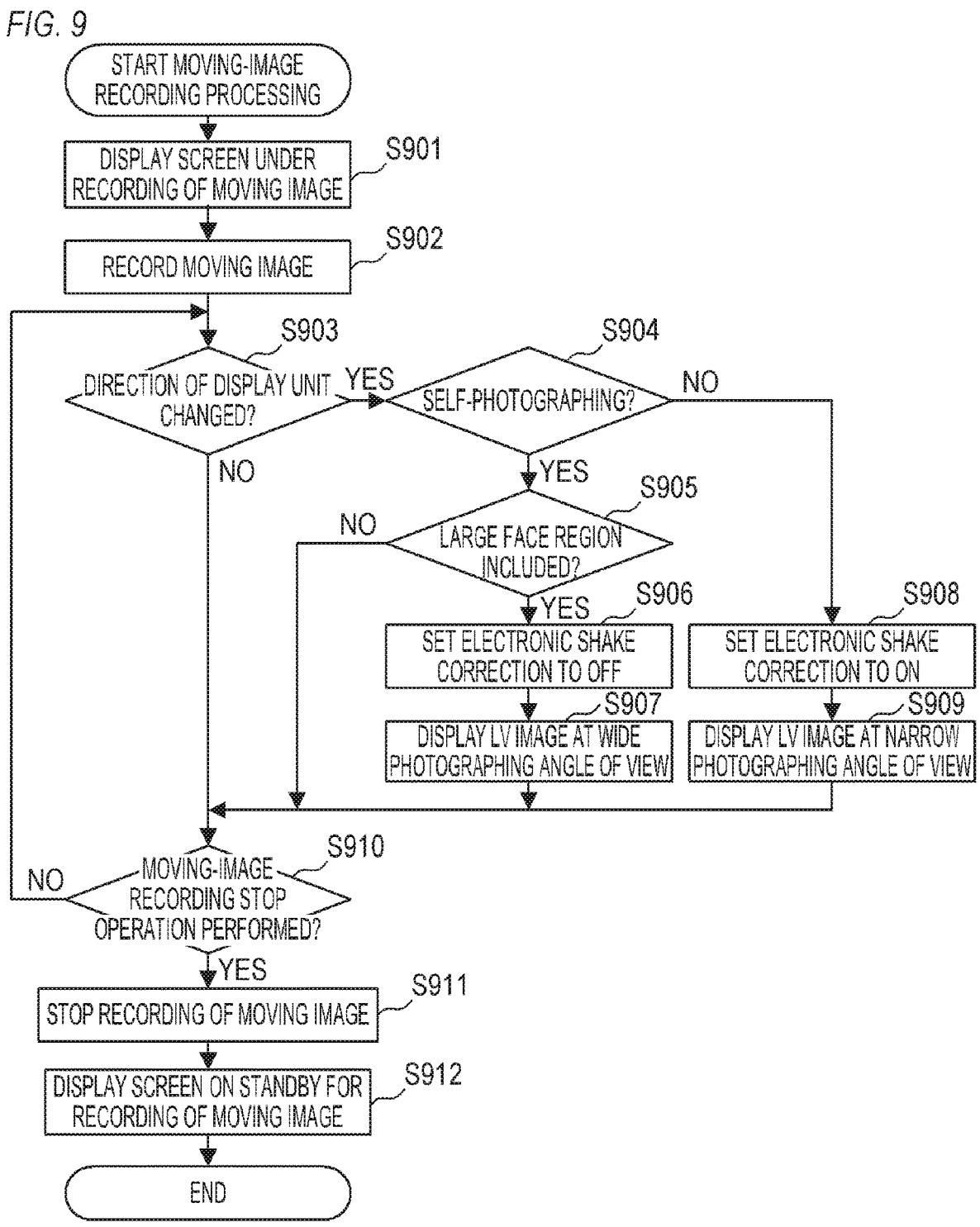
FIG. 9 is a flowchart of moving-image recording processing.

FIG. 9 is a flowchart of another moving-image recording processing. The processing is realized when the system control unit 50 develops the program stored in the nonvolatile memory 56 into the system memory 52 and runs the developed program. In S506 of FIG. 5, the moving-image recording processing of FIG. 8 is performed. In S606 of FIG. 6 or S706 of FIG. 7, the moving-image recording processing of FIG. 8 or FIG. 9 is performed.

The processing of S901 and S902 is the same as the processing of S801 and S802 of FIG. 8. The processing of S903 to S909 is the same as the processing of S707 to S713 of FIG. 7. Further, the processing of S910 to S912 is the same as the processing of S803 to S805 of FIG. 8.

As described above, according to the hand-shake correction mode processing of FIG. 6, the user is enabled to expand a photographing angle of view only by touching a predetermined item (angle-of-view expansion item) in a photographing mode in which the photographing angle of view is narrowed. Moreover, according to the hand-shake correction mode processing of FIG. 7 and the moving-image recording processing of FIG. 9, a photographing angle of view is automatically changed without a user operation when a state change occurs between a state in which self-photographing is not performed and a state in which the self-photographing is performed. Thus, the user is enabled to perform self-photographing at a preferred photographing angle of view including a user himself/herself and a background without changing settings.

Note that the processing of S607 to S612 of FIG. 6 may be performed instead of the processing of S903 to S909 of FIG. 9. Further, the above example describes that a state in which the imaging direction of the imaging unit 22 and the display direction of the display unit 28 are substantially equal to each other is a state in which self-photographing is performed, but the state in which the self-photographing is performed is not limited to the example. For example, the state in which the self-photographing is performed may be a state in which a captured image includes a face region larger than a predetermined size. The determination in at least one of the processing of S607 in FIG. 6, the processing of S708 in FIG. 7, and the processing of S904 in FIG. 9 may be determination as to whether a captured image includes a face region larger than a predetermined size. When the determination as to whether a captured image includes a face region larger than a predetermined size is made in S708, the processing of S709 may be omitted. Similarly, when the determination as to whether a captured image includes a face region larger than a predetermined size is made in S904, the processing of S905 may be omitted.

The above example describes that determination as to whether a captured image includes a face region larger than a predetermined size is made in S709 and S905, but the determination in S709 and S905 is not limited to the example. For example, the size of a face region in a captured image depends on the way of holding the digital camera 100 (how the user holds the digital camera 100 up). However, when a photographing lens (lens unit) has a wide angle of view, it is assumed that a user and a background are substantially included in a photographing angle of view even where the photographing angle of view is narrowed. Therefore, the determination in at least one of the processing of S709 and the processing of S905 may be determination as to whether the angle of view of a photographing lens (lens unit) in use is narrower than a predetermined angle of view. The determination may be interpreted as determination as to whether a photographing lens (lens unit) having an angle of view narrower than a predetermined angle of view is installed in the digital camera 100. In this case, if the photographing lens in use has an angle of view wider than a predetermined angle of view, the electronic shake correction is kept ON (high) and the narrow photographing angle of view is maintained even in a state in which self-photographing is performed. On the other hand, if the photographing lens in use has an angle of view narrower than the predetermined angle of view, the setting of the electronic shake correction is changed to OFF and the photographing angle of view is expanded in the state in which the self-photographing is performed. For example, a photographing lens (narrow-angle lens) having an angle of view narrower than a predetermined angle of view is a lens having a focal distance of longer than 18 mm on a 35-mm basis, and a photographing lens (wide-angle lens) having an angle of view wider than the predetermined angle of view is a lens having a focal distance of not more than 18 mm on the 35-mm basis.

The above example describes that the setting of the electronic shake correction is switched between OFF and ON (high) according to whether a state in which self-photographing is performed is created, but the setting of the electronic shake correction may be switched between ON (low) and ON (high) according to whether the state in which the self-photographing is performed is created. In at least one of the hand-shake correction mode processing of FIG. 6, the hand-shake correction mode processing of FIG. 7, and the moving-image recording processing of FIG. 9, the electronic shake correction may be set to ON (low) instead of OFF. Both ON (high) and ON (low) indicate settings for performing the electronic shake correction, but the intensity of the electronic shake correction is lower at ON (low) than at ON (high). For example, the state of ON (low) corresponds to the state of FIG. 4H. A photographing angle of view set at ON (low) is wider than a photographing angle of view set at ON (high). Then, the screen of FIG. 4D is displayed on the display unit 28 instead of the screen of FIG. 4C. On the screen of FIG. 4D, an item 445 is displayed instead of the item 425 of FIG. 4C. Further, the items 421, 412, 413, 414, 416, and 437 are also displayed on the screen of FIG. 4D like FIG. 4C. The item 445 is an item showing the current setting (ON (low)) of the electronic shake correction, and is a touch-operable item. The setting of the electronic shake correction is changed when the item 425 is touched. Thus, it is possible to prevent deformations of a captured image due to vibrations of the digital camera 100 even where self-photographing is performed.

The above example describes that a photographing angle of view is automatically changed in consideration of deter-mination as to whether a state in which self-photographing is performed is created and the size of a face region, but the photographing angle of view may be automatically changed according to whether the state in which the self-photograph-ing is performed is created only. In this case, a narrow photographing angle of view may be automatically changed to a wide photographing angle of view at any time when a state change occurs from a state (normal state) in which self-photographing is not performed to a state (self-photo-graphing state) in which the self-photographing is per-formed.

There are some users who want a photographing angle of view to be automatically changed from the viewpoint of convenience when recording of a moving image is not performed (in the case of a photographing standby state) but do not want the photographing angle of view to be auto-matically changed when the recording of the moving is performed. Therefore, the photographing angle of view may be automatically expanded in accordance with a state change from a normal state to a self-photographing state when recording of a moving image is not performed, but may not be automatically expanded regardless of the state change from the normal state to the self-photographing state when the recording of the moving image is performed. Also, there are some users who do not want a photographing angle of view to be automatically changed since the users want to change the photographing angle of view by themselves when recording of a moving image is not performed but want the photographing angle of view to be automatically changed since the users want to devote themselves to confirmation of an object when the recording of the moving image is performed. Therefore, the photographing angle of view is automatically expanded in accordance with a state change from a normal state to a self-photographing state when recording of a moving image is performed, but may not be automatically expanded regardless of the state change from the normal state to the self-photographing state when the recording of the moving image is not performed. Also, there are some users who want a photographing angle of view to be automatically and quickly changed from the viewpoint of convenience when recording of a moving image is not performed but do not want the photographing angle of view to be automatically and quickly (rapidly) changed when the recording of the moving image is per-formed. Therefore, the photographing angle of view may be automatically and gradually expanded at a speed slower than a speed of a case where recording of a moving image is not performed in accordance with a state change from a normal state to a self-photographing state when recording of a moving image is performed. In these operations, information (for example, the size of a face region or the angle of view of a photographing lens) other than information as to whether a state in which self-photographing is performed is created may be considered.

The above example describes that the angle-of-view expansion item is displayed during the moving-image pho-tographing mode or the photographing angle of view is automatically changed, but the angle-of-view expansion item may be displayed during a still-image photographing mode or the photographing angle of view may be automati-cally changed.

Note that the above various control described as being performed by the system control unit 50 may be performed by one hardware, or processing may be borne by a plurality of hardware (for example, a plurality of processors or circuits) to control the whole device.

Further, the embodiments of the present disclosure are described in detail above. However, the present disclosure is not limited to the specific embodiments, and various modes are also included in the present disclosure within the scope of the present disclosure. Moreover, each of the embodiments described above shows only one embodiment of the present disclosure, and the respective embodiments may be appropriately combined together.

Further, the case where the present disclosure is applied to the digital camera is described as an example in the above embodiments. The present disclosure is not limited to the example but is applicable to electronic equipment (imaging devices) so long as they are capable of capturing images. For example, the present disclosure is applicable to personal computers, PDAs, mobile telephone terminals, mobile image viewers, printer devices, digital photo frames, music players, video-game machines, electronic book readers, or the like. Further, the present disclosure is applicable to video players, display devices (including projection devices), tablet terminals, smart phones, AI speakers, home-electric devices, in-vehicle devices, or the like.

According to the present disclosure, it is possible to perform display or recording of self-photographing images at an appropriate photographing angle of view according to whether a self-photographing state is created.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-046696, filed on Mar. 23, 2023, which is hereby incorporated by reference herein in its entirety.

What is claimed is:

1. An imaging device comprising:

an image sensor; and a controller configured to perform control to display or record a range of at least a part of an image captured by the image sensor, wherein in a first state in which self-photographing is not performed, the controller performs control to display or record a first range of the image, in a second state in which the self-photographing is performed, the controller performs control to display or record a second range wider than the first range of the image, wherein in a case where recording of a moving image is not performed, the controller performs control to automatically change a range to be displayed or recorded from the first range to the second range in accordance with a state change from the first state to the second state, and in a case where the recording of the moving image is performed, the controller performs control not to automatically change the range to be displayed or recorded from the first range to the second range regardless of the state change from the first state to the second state.

2. The imaging device according to claim 1, wherein the controller switches from display of an image in the first range to display of an image in the second range in accordance with a state change from the first state to the second state.

3. The imaging device according to claim 1, wherein the first state is a state in which a display direction of a display that displays the image captured by the image sensor is not oriented to an imaging direction side of the image sensor, and the second state is a state in which the display direction of the display is oriented to the imaging direction side of the image sensor.

4. The imaging device according to claim 1, wherein the controller performs control to display the range of the image captured by the image sensor as a live-view image.

5. The imaging device according to claim 1, further comprising:

a display configured to display the image captured by the image sensor, the display being capable of changing a display direction by changing a positional relationship of the display with respect to a body of the imaging device; and a detector configured to detect the positional relationship of the display with respect to the body, wherein the first state is a state in which the display direction of the display is not oriented to an imaging direction side of the image sensor, the second state is a state in which the display direction of the display is oriented to the imaging direction side of the image sensor, and the controller switches between display or recording of an image in the first range and display or recording of an image in the second range according to a detection result by the detector.

6. The imaging device according to claim 1, wherein in a case where a photographing lens in use has an angle of view wider than a predetermined angle of view, the controller performs control to display or record the first range even in the second state, and in a case where the photographing lens in use has the angle of view narrower than the predetermined angle of view, the controller performs control to display or record the second range in the second state.

7. The imaging device according to claim 1, wherein in a case where the image does not include a face region larger than a predetermined size, the controller performs control to display or record the first range even in the second state, and in a case where the image includes the face region larger than the predetermined size, the controller performs control to display or record the second range in the second state.

8. An imaging device comprising:

an image sensor; and a controller configured to perform control to display or record a range of at least a part of an image captured by the image sensor, wherein in a first state in which self-photographing is not performed, the controller performs control to display or record a first range of the image, in a second state in which the self-photographing is performed, the controller performs control to display or record a second range wider than the first range of the image, wherein in a case where recording of a moving image is performed, the controller performs control to automatically change a range to be displayed or recorded from the first range to the second range in accordance with a state change from the first state to the second state, and in a case where the recording of the moving image is not performed, the controller performs control not to automatically change the range to be displayed or recorded from the first range to the second range regardless of the state change from the first state to the second state.

9. A control method of an imaging device, comprising:

performing capturing; and performing control to display or record a range of at least a part of a captured image, wherein in a first state in which self-photographing is not performed, control is performed to display or record a first range of the image, in a second state in which the self-photographing is performed, control is performed to display or record a second range wider than the first range of the image, wherein in a case where recording of a moving image is not performed, control is performed to automatically change a range to be displayed or recorded from the first range to the second range in accordance with a state change from the first state to the second state, and in a case where the recording of the moving image is performed, control is performed not to automatically change the range to be displayed or recorded from the first range to the second range regardless of the state change from the first state to the second state.

10. A non-transitory computer readable medium that stores a program, wherein the program causes a computer to execute a control method of an imaging device, the control method comprising:

performing capturing; and performing control to display or record a range of at least a part of a captured image, wherein in a first state in which self-photographing is not performed, control is performed to display or record a first range of the image, in a second state in which the self-photographing is performed, control is performed to display or record a second range wider than the first range of the image, wherein in a case where recording of a moving image is not performed, control is performed to automatically change a range to be displayed or recorded from the first range to the second range in accordance with a state change from the first state to the second state, and in a case where the recording of the moving image is performed, control is performed not to automatically change the range to be displayed or recorded from the first range to the second range regardless of the state change from the first state to the second state.

11. An imaging device comprising:

an image sensor; and a controller configured to perform control to display or record a range of at least a part of an image captured by the image sensor, wherein in a first state in which self-photographing is not performed, the controller performs control to display or record a first range of the image, in a second state in which the self-photographing is performed, the controller performs control to display or record a second range wider than the first range of the image, in a case where a photographing lens in use has an angle of view wider than a predetermined angle of view, the controller performs control to display or record the first range even in the second state, and in a case where the photographing lens in use has the angle of view narrower than the predetermined angle of view, the controller performs control to display or record the second range in the second state.

* * * * *